(12) United States Patent
Warmington et al.

(10) Patent No.: US 12,319,130 B2
(45) Date of Patent: Jun. 3, 2025

(54) VEHICLE DOOR ASSEMBLY

(71) Applicant: JAGUAR LAND ROVER LIMITED, Coventry (GB)

(72) Inventors: Robin Warmington, Coventry (GB); Paul John Moreton-Smith, Coventry (GB); Jim Bryant, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 0 days.

(21) Appl. No.: 18/046,792

(22) Filed: Oct. 14, 2022

(65) Prior Publication Data

US 2023/0118935 A1 Apr. 20, 2023

(51) Int. Cl.
*B60J 10/75* (2016.01)
*B60J 5/04* (2006.01)

(52) U.S. Cl.
CPC ............ *B60J 10/75* (2016.02); *B60J 5/0411* (2013.01); *B60J 5/0415* (2013.01); *B60J 5/0468* (2013.01)

(58) Field of Classification Search
CPC ......... B60J 10/75; B60J 5/0411; B60J 5/0426
See application file for complete search history.

(56) References Cited

U.S. PATENT DOCUMENTS

| | | | | |
|---|---|---|---|---|
| 5,561,003 A * | 10/1996 | Nowosiadly | ............ | B60J 10/30 49/495.1 |
| 7,448,670 B2 * | 11/2008 | Baker | ................... | B60J 5/0444 49/502 |
| 2006/0079167 A1 * | 4/2006 | Krause | ..................... | B60J 10/24 454/121 |
| 2006/0152035 A1 * | 7/2006 | Baker | ................... | B60J 5/0444 296/146.6 |
| 2007/0108794 A1 * | 5/2007 | Yagi | ........................ | B60J 5/0426 296/187.11 |
| 2007/0120394 A1 * | 5/2007 | Nakamori | ............. | B60J 5/0426 49/502 |
| 2007/0199248 A1 * | 8/2007 | Rieder | ..................... | B60J 10/75 49/377 |
| 2008/0007087 A1 * | 1/2008 | Endo | ..................... | B60J 5/0483 296/187.01 |

(Continued)

FOREIGN PATENT DOCUMENTS

| | | | | |
|---|---|---|---|---|
| DE | 4244233 A1 * | 7/1993 | ................ | B60J 1/14 |
| DE | 19824932 A1 * | 12/1998 | ............ | B60J 5/0411 |

(Continued)

OTHER PUBLICATIONS

Great Britain Intellectual Property Office, Combined Search and Examination Report under Sections 17 and 18(3) Issued in Application No. GB2114674.1, Apr. 25, 2022, 8 pages.

(Continued)

*Primary Examiner* — Marcus Menezes
(74) *Attorney, Agent, or Firm* — McCoy Russell LLP

(57) ABSTRACT

A vehicle door assembly comprises: an outer door panel skin; and a seal carrier rail, wherein the seal carrier rail is shaped to provide: a first elongate recess at a first face of the seal carrier rail configured to accommodate a waist seal within the first elongate recess; and a second elongate recess at a second face of the seal carrier rail opposite the first face, wherein the second elongate recess is located between the seal carrier rail and the outer door panel skin.

18 Claims, 9 Drawing Sheets

(56) References Cited

U.S. PATENT DOCUMENTS

| | | | |
|---|---|---|---|
| 2013/0026717 A1* | 1/2013 | MacDonald | B60J 10/20 |
| | | | 29/527.1 |
| 2017/0036521 A1* | 2/2017 | Ogawa | B60J 5/0431 |
| 2017/0136856 A1* | 5/2017 | Sugie | B60J 5/0493 |
| 2018/0072141 A1* | 3/2018 | Shimoda | B60J 5/0426 |
| 2018/0209457 A1* | 7/2018 | Snoeyink | B60R 13/04 |
| 2020/0384834 A1* | 12/2020 | Iozzo | B60J 5/042 |
| 2021/0387517 A1* | 12/2021 | Moriyama | B60J 5/0463 |

FOREIGN PATENT DOCUMENTS

| | | | | |
|---|---|---|---|---|
| DE | 102013216729 A1 * | 2/2015 | | B60J 10/30 |
| DE | 102015014819 A1 * | 5/2016 | | |
| DE | 202018100382 U1 * | 3/2018 | | B60J 5/04 |
| EP | 1388449 A1 * | 2/2004 | | B60J 10/32 |
| FR | 2975348 A1 | 11/2012 | | |
| FR | 3051733 A1 * | 12/2017 | | B60J 10/273 |
| GB | 1358373 A * | 7/1974 | | B60J 10/265 |
| JP | 2012030754 A | 2/2012 | | |
| WO | WO-2005042286 A1 * | 5/2005 | | B60J 10/30 |

OTHER PUBLICATIONS

Great Britain Intellectual Property Office, Combined Search and Examination Report under Sections 17 and 18(3) Issued in Application No. GB2114673.3, Apr. 26, 2022, 8 pages.

* cited by examiner

VEHICLE DOOR ASSEMBLY

CROSS REFERENCE TO RELATED APPLICATION

The present application claims priority to Great Britain Patent Application No. 2114674.1 filed on Oct. 14, 2021 and to Great Britain Patent Application No. 2114673.3 filed on Oct. 14, 2021. The entire contents of each of the above-listed applications are hereby incorporated by reference for all purposes.

TECHNICAL FIELD

The present disclosure relates to an assembly for a vehicle door. The present disclosure also relates to a vehicle door, and a vehicle. In addition, the present disclosure relates to a method of assembling a vehicle door.

BACKGROUND

The driver and passenger doors of passenger and commercial vehicles typically comprise an external waist seal to prevent water ingress into the interior of the vehicle door via the gap which exists between the uppermost edge of the outer door panel and the moveable glass window. A secondary purpose of the waist seal is to damp vibrations of the glass when it is in the open position and hence located partially or fully within the structure of the door.

Waist seals are typically located along the uppermost edge of the outer door panel such that they fulfil a dual purpose of preventing water ingress and providing an aesthetic trim for the edge of the door panel.

Vehicle styling is of vital importance in the competitive passenger vehicle market, especially so for premium brands that compete not only on vehicle performance but also on superior styling. It is desirable from an aesthetic point of view for the waist seal to be hidden from the view of a vehicle user when the vehicle is viewed by the user in normal use. That is to say, when a user observes the vehicle when it is parked or in motion, when opening and closing the doors, and when driving the vehicle or riding in the vehicle as a passenger.

For the waist seal to be hidden from view, it is necessary to locate it inside the structure of the door below the uppermost edge of the outer door panel. However, this presents a problem as relocation of the waist seal from the uppermost edge of the outer door panel to the interior of the door structure deprives the uppermost edge of the outer door panel of its finishing trim.

This is somewhat less of a problem for frameless doors, such as used for convertible and cabriolet style vehicles, which may be fabricated with a hemmed connection between the outer door panel and the door structure. However, for framed doors found on the majority of roofed vehicles, it is not possible to hem the uppermost edge of the outer door panel as the posts of the window frame prevent access of the hemming tool along the whole width of the uppermost edge of the outer door panel.

It is against this background that the present disclosure has been developed.

SUMMARY

Aspects and embodiments of the present disclosure provide a vehicle door assembly, a vehicle door, a vehicle, and a method of manufacturing a vehicle door assembly.

In an aspect there is provided a vehicle door assembly comprising:
  an outer door panel skin; and
  a seal carrier rail;
  wherein the seal carrier rail is shaped to provide:
    a first elongate recess at a first face of the seal carrier rail configured to accommodate a waist seal within the first elongate recess; and
    a second elongate recess at a second face of the seal carrier rail opposite the first face, wherein the second elongate recess is located between the seal carrier rail and the outer door panel skin.

The first elongate recess provides an upper volume between the door glass, seal carrier rail and outer door panel skin in which to accommodate a waist seal below the upper surface of the outer door panel skin. This arrangement allows the waist seal to be housed behind the upper portion of the outer door panel skin, sheltering it from adverse weather exposure or exposure to dirt, grit or dust, which may cause damage to the waist seal. This also allows the waist seal to be housed out of sight, which improves the aesthetic of the door and vehicle.

The second elongate recess below the first elongate recess forms a lower volume beneath the waist seal The first and second elongate recesses facilitate the use of different types of fastener (e.g. friction-based or threaded fasteners). For example, a nut and bolt fastener arrangement or similar may be used. The head of the bolt may be accommodated in the first elongate recess. A nut may fix the bolt in place to secure the waist seal to the seal carrier rail, and the nut may be accommodated in the second elongate recess. The shape of the second elongate recess may also increase the outer door panel skin stiffness without adding unnecessary weight. The seal carrier rail may be affixed in the door assembly at different points, and the zig-zag/bent cross sectional form of the seal carrier rail may greatly add to door panel skin rigidity and door strength. So, the rigidity of the door is not as dependent on how and where the parts are fixed together, since the form of the seal carrier rail makes a large contribution itself to door rigidity.

In such a vehicle door assembly, a first portion of the seal carrier rail proximal to an upper seal carrier rail edge may be secured to an uppermost portion of the outer door panel skin, the uppermost portion of the outer door panel skin comprising an uppermost outer door panel skin edge. The first elongate recess may be arranged to accommodate a waist seal below said uppermost outer door panel skin edge.

A first portion of the seal carrier rail proximal to an upper seal carrier rail edge may be canted at a first bend in the seal carrier rail.

A channel of the waist seal may be formed by an inner side portion, a support portion, and an outer side portion, and the waist seal may sit inside the upper door panel portion of the door panel skin with the support portion secured to the seal attachment portion of the seal carrier rail. The upper door panel portion thereby hides the waist seal from normal view, or in other words, the seal attachment portion and waist seal are not visible in normal use (i.e. when a person is walking past, or approaching the vehicle to enter.)

The first portion of the seal carrier rail and an upper seal carrier rail edge proximal to the first portion may be located inside, and secured to the outer door panel skin by, a hemmed connection of the outer door panel skin. The hemmed connection therefore provides an aesthetically pleasing, readily manufactured, strong connection point to fix the seal carrier rail in place in the upper portion of the door panel.

The seal carrier rail may be shaped to form the second elongate recess by comprising:
a first bend between a first portion of the seal carrier rail proximal to an upper seal carrier rail edge and a seal attachment portion of the seal carrier rail to orient the seal attachment portion away from the outer door panel skin, wherein the first portion is aligned coplanar with an uppermost portion of the outer door panel skin;
a second bend between the seal attachment portion of the seal carrier rail and a lower portion of the seal carrier rail to orient the lower portion towards the outer door panel skin; and a third bend between the lower portion and a second portion of the seal carrier rail to orient the second portion coplanar with the outer door panel skin.

The seal carrier rail may be shaped to form the second elongate recess by further comprising a further bend in the seal attachment portion between an upper seal attachment portion of the seal attachment portion and a lower fixing portion of the seal attachment portion, the upper seal attachment portion configured to have a waist seal affixed thereto.

The second elongate channel may thereby form a box-shaped, or polygonal, cross sectional recess, to improve stiffness of the assembly. By improving stiffness characteristics of the door panel, noise, vibration and harshness (NVH) characteristics of the door and vehicle in turn are improved.

The lower portion of the seal attachment rail may be substantially horizontal when installed in a vehicle in a usual orientation i.e. all vehicle wheels contacting horizontal ground. This horizontal arrangement of the lower portion of the seal attachment rail may improve structural stability of the door panel.

The vehicle door assembly may further comprise a waist seal located within the first elongate recess. A bend along the length of the waist seal located between an outer side portion of the waist seal and a support portion of the waist seal may be located within the first bend of the seal carrier rail. This nesting of the waist seal inside the bend, or crook, of the seal carrier rail may provide good structural support to the waist seal, such as when operating the window to move up and down against the sealing limb.

The outer side portion of the waist seal may abut the first portion of the seal carrier rail. The first portion of the seal carrier rail may abut the uppermost portion of the outer door panel skin. Such abutments may contribute to improving the security of the fixing of the waist seal to the seal carrier rail and the fixing of the seal carrier rail to the outer door panel skin.

The vehicle door assembly may further comprise a fixture configured to attach the support portion of the waist seal to a seal attachment portion of the seal carrier rail. The fixture may comprise a head located in the first elongate recess; and a tip opposite the head, the tip located in the second elongate recess. The vehicle door assembly may further comprising a fastener located in the second elongate recess. The fastener may be configured to fit around the tip of the fixture and, with the fixture, secure the waist seal to the seal attachment portion of the seal carrier rail. The fastener may be integrally formed in or on the seal carrier rail.

Such a fixture may be formed to provide structural support, and the presence of the first and second elongated portions of the seal carrier rail provide for design and manufacturing freedom in choosing a suitably shaped and operatable fixture by providing space for portions of the fixture to be located in the door assembly. The fixture may, for example, have a fixture head, such as a bolt head, with a shape extending outwards against the waist seal to support the fixture against the waist seal. Such a fixture head can provide good load spread from the fixing and help to support the outer side portion of the waist seal against the first portion of the seal carrier rail.

The fixture may comprises a head shaped to extend towards one or more of:
a bend along the length of the waist seal between an outer side portion of the waist seal and a support portion of the waist seal; and
a bend along the length of the waist seal between an inner side portion of the waist seal and the support portion of the waist seal.

This fixture head form may help to spread any bending loading caused by friction between the glass and the waist seal which may otherwise typically act to drive seal deflection (lozenging). A broad/extended head of the fastener helps stiffen the base of the waist seal between the inner and outer limbs of the waist seal, further improving performance in use.

The vehicle door assembly may further comprise a waist rail. The waist rail may comprise one or more of:
a first bend between a first waist rail portion and a second waist rail portion, the first bend configured to orient the first waist rail portion coplanar with a seal attachment portion of the seal carrier rail and direct the second waist rail portion towards the outer door panel skin; and
a second bend between the second waist rail portion and a third waist rail portion, the second bend configured to orient the third waist rail portion to be coplanar with and adjacent to the outer door panel skin.

The shape of the waist rail, similarly to the shape of the seal carrier rail, may act to improve door panel assembly stability and stiffness and thus in turn reduce NVH noise. The first bend may be parallel with, and in the opposite direction to, the second bend, in some examples. The second bend may be located adjacent to the outer door panel skin for affixing thereto, for example by a fixing such as an anti-flutter fixing.

The waist rail may be attached to one or more of: the seal attachment portion of the of the seal carrier rail; and the outer door panel skin.

The waist rail may be attached to the seal attachment portion by one or more of:
a fixture fixing the waist rail to the seal attachment portion of the seal carrier rail; and
a waist seal and the seal attachment portion of the seal carrier rail sandwiching an edge of the waist rail therebetween.

The seal carrier rail may be attached to one or more of:
a first fixing point attaching a first portion proximal to a first edge of the seal carrier rail to the outer door panel skin, by a hemmed connection of the outer door panel skin;
a second fixing point of a seal attachment portion of the seal carrier rail to a waist rail; and
a third fixing point of a second portion proximal to a second edge of the seal attachment portion, opposite the first edge of the seal carrier rail, to the outer door panel skin.

In an aspect there is provided a method of manufacturing a vehicle door assembly, the method comprising:
forming a seal carrier rail to comprise:
a first elongate recess at a first face of the seal carrier rail; and
a second elongate recess at a second face of the seal carrier rail opposite the first face;

fixing an outer door panel skin to a first portion of the seal carrier rail by hemming an upper portion of the outer door panel skin over a first edge of the first portion of the seal carrier rail to form a hemmed connection; and fixing the outer door panel skin to a second portion of the seal carrier rail, the second portion at an opposite side of the seal carrier rail to the first portion, such that the second elongate recess is located between the seal carrier rail and the outer door panel skin.

The method of manufacturing a vehicle door assembly may further comprise:

accommodating a waist seal below an uppermost outer door panel skin edge of the hemmed connection; and fixing the accommodated waist seal within the first elongate recess.

In this way, the structurally supportive elements of the vehicle door assembly (i.e. the outer door panel skin and the seal carrier rail) are first assembled including providing a hemmed connection (that is, there is sufficient working space to allow for the manufacture of the door panel assembly by providing the hemmed connection), and this sub-assembly may then be fitted with the waist seal. Thus manufacture is possible to both include the desirable hemmed connection at the top of the door panel assembly, and the waist seal can be accommodated underneath the hemmed connection within the upper portion of the door panel The method of manufacturing a vehicle door assembly may further comprise fixing a waist rail to the seal carrier rail.

In an aspect there is provided a vehicle door comprising the vehicle door assembly as disclosed herein.

In an aspect there is provided a vehicle comprising the vehicle door assembly as disclosed herein.

Examples disclosed herein provide an assembly for a vehicle framed door, the assembly comprising: an outer door panel skin; a waist rail; and a seal carrier rail, wherein the seal carrier rail is attached to the waist rail, and wherein the outer door panel skin is attached to a portion of the seal carrier rail. This arrangement allows for the outer door panel skin to be attached to the seal carrier rail before the seal carrier rail is attached to the waist rail thereby making access for tooling easier during the skin attachment process.

Optionally the waist rail comprises a first portion located adjacent a first edge of the waist rail, and a second portion located adjacent a second edge of the waist rail; and the seal carrier rail comprises a first portion located adjacent a first edge of the seal carrier rail, and a second portion located adjacent a second edge of the seal carrier rail, wherein the outer door panel skin is attached to the first portion of the seal carrier rail, and wherein the seal carrier rail is attached to the waist rail such that the first portion of the seal carrier rail extends beyond the first edge of the waist rail, and the second portion of the waist rail extends beyond the second edge of the seal carrier rail. This arrangement places the door skin well above the waist rail thereby improving aesthetic appearance.

The seal carrier rail optionally comprises a seal attachment portion located adjacent the first portion of the seal carrier rail to facilitate attachment of a waist seal proximate the top of the vehicle door.

The seal attachment portion may comprise a plurality of apertures for receiving mechanical fixings.

In some examples the seal carrier rail comprises a mid-portion located adjacent the seal attachment portion, wherein the mid-portion of the seal carrier rail is attached to the first portion of the waist rail allowing for attachment of the waist rail below the waist seal location in the assembled door.

Optionally the seal carrier rail comprises a plurality of fixing elements located on the mid-portion of the seal carrier rail, and wherein the waist rail comprises a plurality of apertures located in the first portion of the waist rail, wherein at least some of the fixing elements of the seal carrier rail pass through at least some of the apertures in the waist rail. This arrangement facilitates attachment of the seal carrier rail to the waist rail.

The outer door panel skin is optionally attached to the first portion of the seal carrier rail by a hemmed connection to provide a desirable aesthetic.

The second portion of the seal carrier rail and/or the second portion of the waist rail may be connected to the outer door panel skin to help prevent flutter of the outer door panel skin.

Examples disclosed herein provide a vehicle framed door seal assembly comprising: a vehicle framed door assembly as described above and a waist seal comprising: an elongate support portion; an elongate inner-side portion; and an elongate outer-side portion, wherein the inner-side portion and the outer-side portion each comprise a proximal end connected to the support portion and a distal end remote from the support portion, wherein the inner-side portion and the outer-side portion each extend away from opposing sides of the support portion such that together the inner-side portion, the outer-side portion and the support portion form a channel, wherein the support portion is attached to the seal support rail of the vehicle door assembly. Attachment of the support portion directly to the seal support rail reduces complexity and cost since the seal need not be provided with a separate connection feature.

Optionally the support portion of the waist seal comprises a plurality of apertures, wherein the waist seal is attached to the seal carrier rail by a plurality of mechanical fixings which pass through the apertures in the support portion. Alternatively or additionally the support portion of the waist seal optionally comprises a plurality of mechanical fixings, wherein the waist seal is attached to the seal carrier rail by the plurality of mechanical fixings. The plurality of mechanical fixings may be integrally formed with the waist seal.

Examples disclosed herein provide a vehicle door comprising a vehicle framed door seal assembly as described above.

Optionally the waist seal is located within the door in normal use so that it is hidden from view for a user such as a driver or passenger, or for any other person observing the vehicle in day-to-day use.

Examples disclosed herein provide a vehicle comprising a vehicle door as described above.

Examples disclosed herein provide a method of assembling a vehicle framed door, the method comprising: attaching an outer door panel skin to a seal carrier rail; and attaching the seal carrier rail to a waist rail, wherein the outer door panel skin is attached to the seal carrier rail before the seal carrier rail is attached to the waist rail. This method of assembly allows for the outer door panel skin to be attached to the seal carrier rail before the seal carrier rail is attached to the waist rail thereby making access for tooling easier during the skin attachment process.

Optionally the outer door panel skin is attached to the seal carrier rail by a hemmed connection.

The method may optionally comprise attaching a waist seal to the seal carrier rail before or after attachment of the seal carrier rail to the waist rail.

The waist seal may comprise: an elongate support portion; an elongate inner-side portion; and an elongate outer-side portion, wherein the inner-side portion and the outer-side portion each comprise a proximal end connected to the support portion and a distal end remote from the support portion, wherein the inner-side portion and the outer-side portion each extend away from opposing sides of the support portion such that together the inner-side portion, the outer-side portion and the support portion form a channel, wherein the support portion is configured for attachment to the seal carrier rail.

In some examples the waist seal is attached to the seal carrier rail by a plurality of mechanical fixtures each of which passes through a respective aperture in the support portion of the waist seal.

Optionally the waist seal is attached to the seal carrier rail by a plurality of mechanical fixtures each of which passes through a respective aperture in the seal carrier rail. The mechanical fixtures are optionally integrally formed with the waist seal.

Examples disclosed herein provide a waist seal for a vehicle door, the vehicle door comprising a support frame and an outer door panel attached to the support frame, the waist seal comprising: an elongate support portion; an elongate inner-side portion; and an elongate outer-side portion, wherein the inner-side portion and the outer-side portion each comprise a proximal end connected to the support portion and a distal end remote from the support portion, wherein the inner-side portion and the outer-side portion each extend away from opposing sides of the support portion such that together the inner-side portion, the outer-side portion and the support portion form a channel, wherein the support portion is configured for attachment to the outer door panel of the vehicle door. Attachment of the support portion to the outer door panel reduces complexity and cost since the seal need not be provided with a separate connection feature.

Optionally the support portion comprises one or more fixing features for facilitating attachment of the waist seal to the outer door panel.

The one or more fixing features may optionally comprise a plurality of apertures, wherein each aperture is configured to receive a fixing for attaching the waist seal to the outer door panel. Alternatively or additionally, the one or more fixing features may comprise one or more mechanical fixings which are configured to be received within respective apertures in the seal carrier rail of the outer door panel.

In some examples, the mechanical fixings are integrally formed with the waist seal for efficiency of manufacture of the waist seal.

Optionally the inner-side portion and the outer-side portion contact one another in the vicinity of their distal ends to help prevent water ingress into the seal in use.

The channel is optionally substantially U-shaped in cross-section and may be configured to adopt a substantially closed cross-section in-use.

In some examples the inner-side portion may comprise a sealing lip which extends towards the outer-side portion and/or the outer-side portion comprises a sealing lip which extends towards the inner-side portion, or away from the inner-side portion to improve sealing between the inner-side portion and the outer-side portion in use.

A section of the inner-side portion optionally comprises a sealing limb, wherein the sealing limb is biased away from the outer-side portion.

A second sealing limb may be located adjacent to the inner-side portion external to the channel to help damp vibration of the door window glass and adsorb shock from door closing.

In some examples the support portion, the inner-side portion, the outer-side portion, the sealing lip or lips when present, and the second sealing limb when present, comprise a single extrusion for efficiency of manufacture.

Examples disclosed herein provide a method of attaching a waist seal to a vehicle door assembly, the method comprising: providing a waist seal as described above; and attaching the support portion of the waist seal to a waist seal support structure of the vehicle door assembly.

Optionally the waist seal comprises a plurality of apertures which are each configured to receive a fixing for attaching the waist seal to the waist seal support structure, the method comprising: placing a mechanical fixing into at least two of the plurality of apertures; and securing each mechanical fixing to the waist seal support structure.

The waist seal optionally comprises a plurality of mechanical fixings which are each configured to be received within an aperture of the waist seal support structure, the method comprising: placing at least some of the mechanical fixings into respective apertures in the waist seal support structure; and securing each mechanical fixing to the waist seal support structure. The mechanical fixings may comprise a clip or plug type fixing.

In some examples the method comprises: extruding a waist seal comprising a support portion, an inner-side portion, and an outer-side portion in a single extrusion process, wherein the inner-side portion and the outer-side portion each comprise a proximal end connected to the support portion and a distal end remote from the support portion, wherein the inner-side portion and the outer-side portion each extend away from opposing sides of the support portion such that together the inner-side portion, the outer-side portion and the support portion form a channel; and forming one or more fixing features for facilitating attachment of the waist seal to an outer door panel of a vehicle door on or in the support portion.

Optionally forming one or more fixing features comprises forming a plurality of apertures in the support portion.

Forming one or more fixing features optionally comprises forming a plurality of mechanical fixings on the support portion.

Examples disclosed herein provide a vehicle door comprising a waist seal as described above.

Examples disclosed herein provide vehicle comprising a vehicle door as described above.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE FIGURES

One or more embodiments of the present disclosure will now be described, by way of example only, with reference to the accompanying drawings, in which.

DETAILED DESCRIPTION

Figure 1:
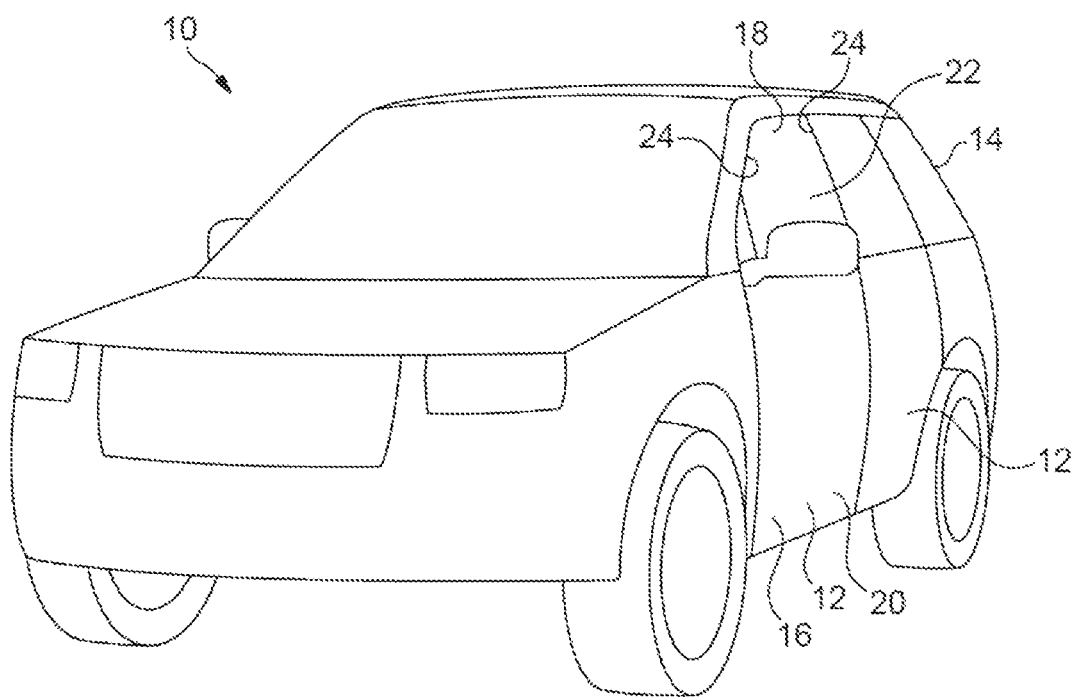
FIG. 1 shows a vehicle comprising a vehicle door assembly according to examples disclosed herein.

FIG. 1 shows a vehicle 10 comprising four side-doors 12 and one luggage compartment door 14. The description below is given in the context of the side-doors 12. However, the waist seal and door construction described below may also be used for the luggage compartment door 14 if desired.

Each side-door 12 comprises a lower portion 16 and an upper portion 18. The lower portion 16 comprises an outer door panel 20 which forms part of the exterior surface of the vehicle 10. As will be described in greater detail below, the outer door panel 20 is attached to an internal structural frame (not shown in FIG. 1) which provides structural strength and rigidity to the door 12. The upper portion 18 of the door 12 comprises a moveable glass pane 22 which is supported, when in the closed position, by a window frame 24.

Figure 2:
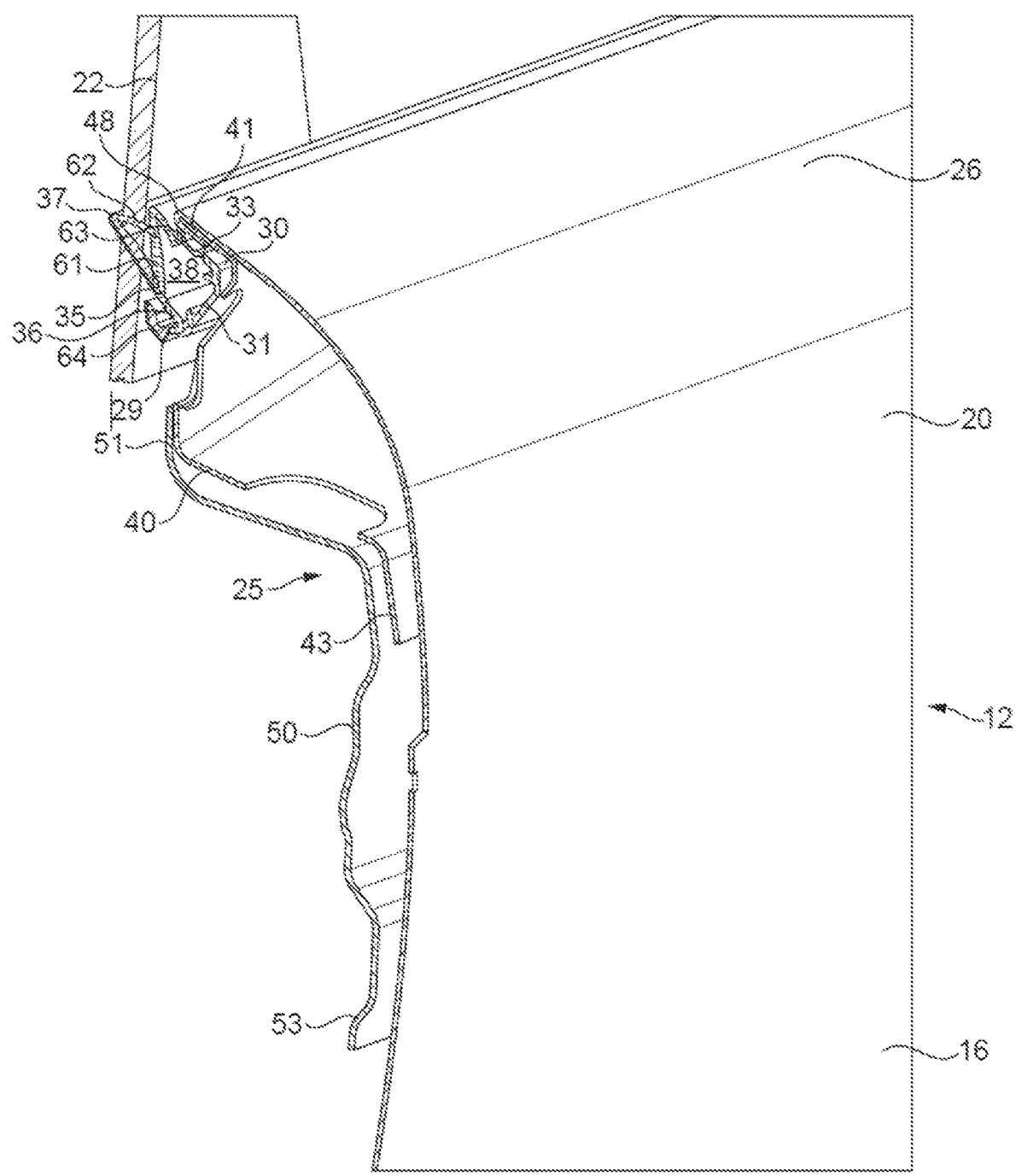
FIG. 2 shows an isometric view of a cross-section taken through a portion of the outer-side of a door of the vehicle according to examples disclosed herein.

FIG. 2 shows an isometric view of a cross-section taken through a portion of the outermost side of the door 12. As discussed above, the lower portion 16 of the door 12 comprises an outer door panel 20 and an inner structural frame 25. The outer door panel 20 itself comprises an outer door panel skin 26 and a seal carrier rail 40. The inner structural frame 25 comprises a waist rail 50 to which a seal carrier rail 40 is attached as will be described in greater detail below.

Figure 3:
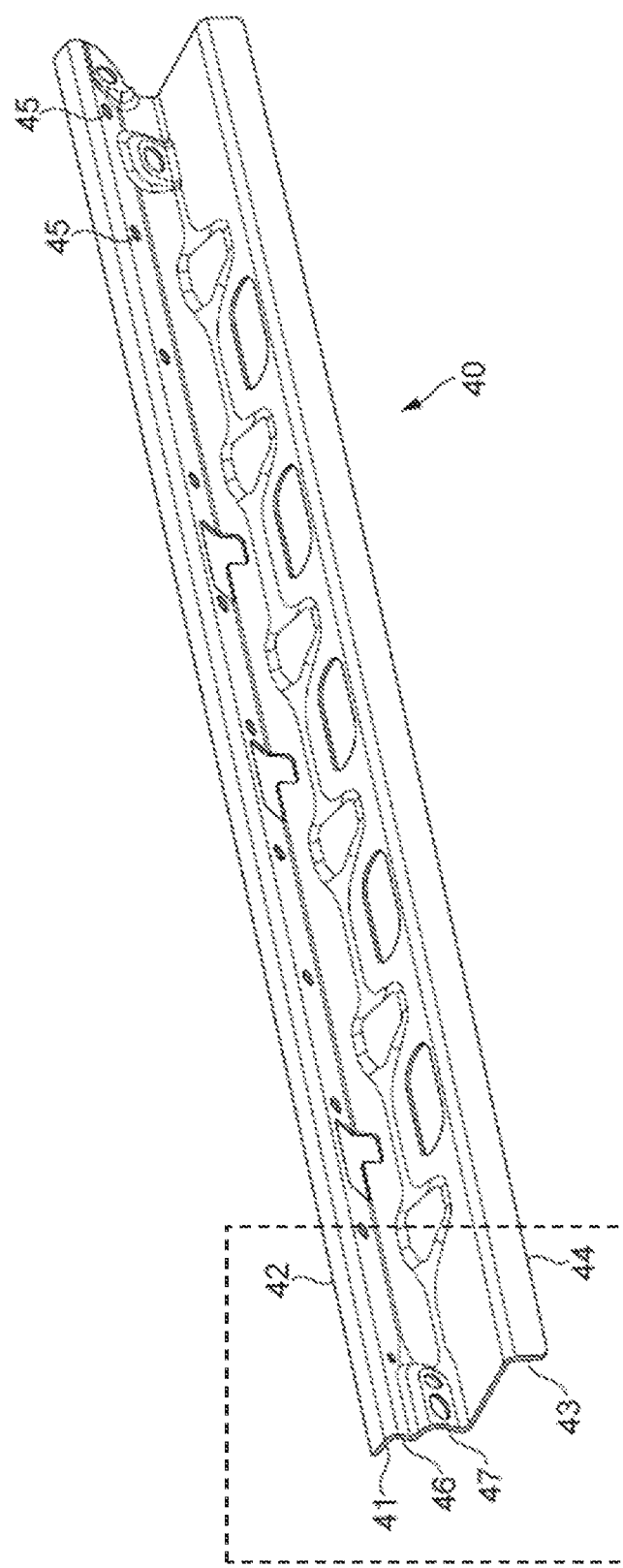
FIG. 3 shows an isometric view of a seal carrier rail according to examples disclosed herein.

Referring to FIG. 3, the seal carrier rail 40 comprises a first portion 41 located adjacent a first edge 42 of the seal carrier rail 40, and a second portion 43 located adjacent a second edge 44 of the seal carrier rail 40. The outer door panel skin 26 is attached to the first portion 41 of seal carrier rail 40 by a hemmed connection 48 (as shown in FIG. 2) such that the outer door panel skin 26 is folded over the first edge 42 of the seal carrier rail 40. Together, the seal carrier rail 40 and the outer door panel skin 26 form the outer door panel 20.

Figure 4:
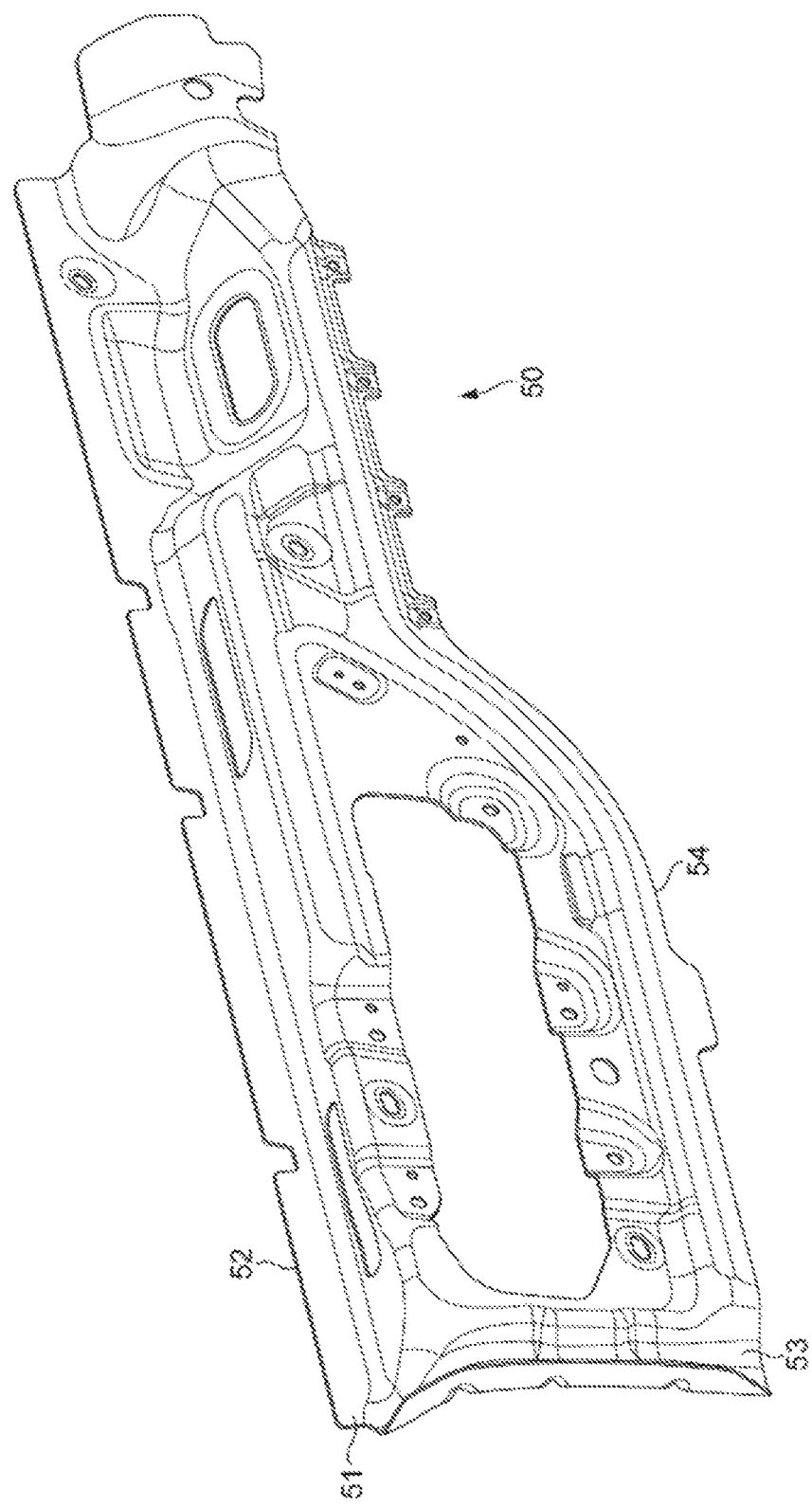
FIG. 4 shows an isometric view of a structural waist rail according to examples disclosed herein.

Referring now to FIG. 4, the waist rail 50 comprises a first portion 51 located adjacent a first edge 52 of the waist rail 50, and a second portion 53 located adjacent a second edge 54 of the waist rail 50. As best shown in FIG. 2, in the assembled door 12 the seal carrier rail 40 of the outer door panel 20 is attached to the waist rail 50 of the inner structural frame 25. Because the outer door panel skin 26 is hemmed to the seal carrier rail 40 before the seal carrier rail 40 is attached to the waist rail 50, the location of the window frame 24 does not interfere with the hemming tool used to form the hemmed connection 48.

Figure 5:
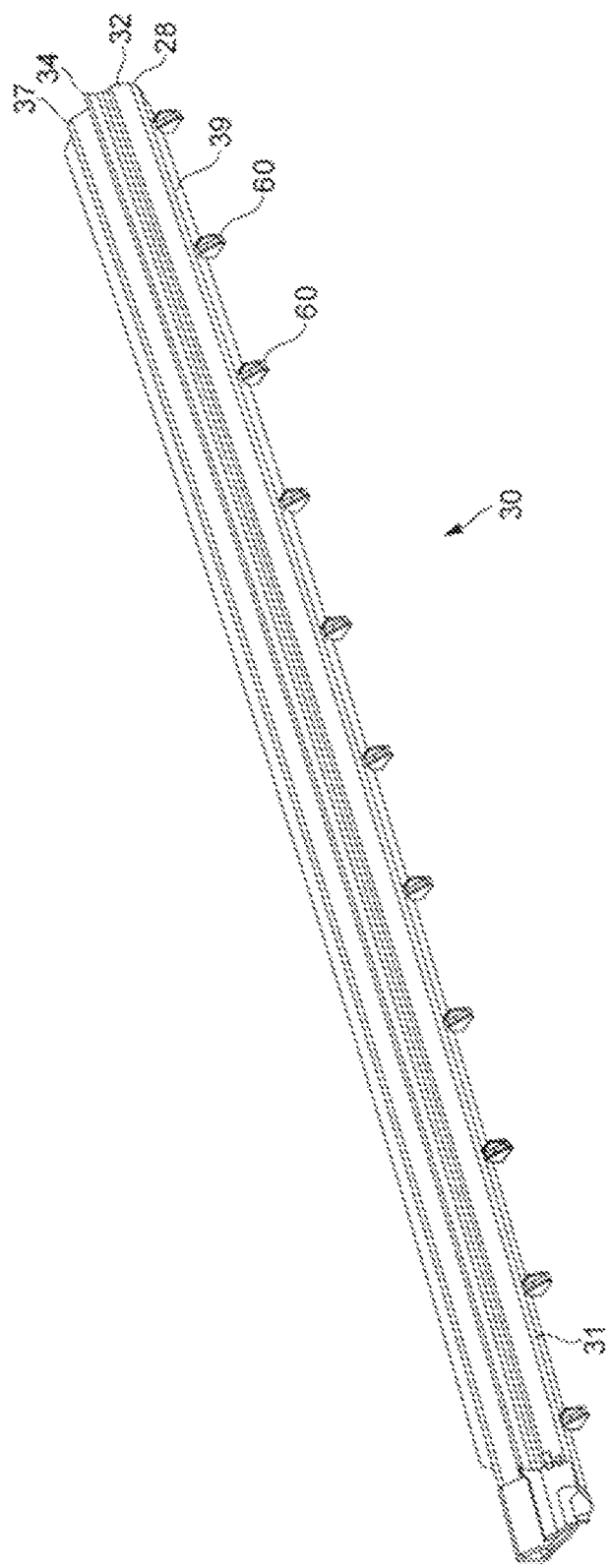
FIG. 5 shows an isometric view of a waist seal according to examples disclosed herein.

FIG. 5 shows an isometric view of the waist seal 30. Referring to both FIG. 2 and FIG. 5, the waist seal 30 comprises an elongate support portion 31 bounded on an outer-side 28 (with reference to the outer door panel 20) by an elongate outer-side portion 33, and bounded on an inner-side 29 (with reference to the outer door panel 20) by an elongate inner-side portion 35. The outer-side portion 33 comprises a proximal end 32 which is contiguous with the outer-side 28 of the support portion 31, and a distal end 34 which is remote from the support portion 31. Similarly, the inner-side portion 35 comprises a proximal end 36 which is contiguous with the inner-side 29 of the support portion 31, and a distal end 37 which is remote from the support portion 31. The inner-side portion 35 and the outer-side portion 33 each extend away from the opposing inner 29 and outer 28 sides of the support portion 31 such that together the inner-side portion 35, the outer-side portion 33, and the support portion 31 form a channel 38.

As best shown in FIG. 2, support portion 31 of the waist seal 30 is attached to the seal carrier rail 40 of the outer door panel 20. In this embodiment, the waist seal 30 comprises a plurality of self-fixing plug connectors or fasteners 60 located on the exterior side 39 of the support portion 31.

Referring once again to FIG. 3, the seal carrier rail 40 comprises a plurality of apertures 45 which are each configured to receive one of the plurality of plug connectors 60. The plug connectors 60 are each configured so that they may readily pass through the respective apertures 45 on the seal carrier rail 40 in one direction, but not pass back through the apertures 45 as readily, or at all. Such plug connectors are well known in the art. The exterior side 39 of the support portion 31 may also be attached to the seal carrier rail 40 with an adhesive in addition to the plug connectors 60. As will be apparent to the person skilled in the art, any suitable method may be employed to attach the waist seal 30 to the seal carrier rail 40, some non-exhaustive examples of which are given below.

The support portion 31 of the waist seal 30 is attached to the seal carrier rail 40 at a seal attachment portion 46. The seal attachment portion 46 is located adjacent the first portion 41 of the seal carrier rail and the plurality of apertures 45 are located in the seal attachment portion 46.

The seal carrier rail 40 also comprises a mid-portion 47 located adjacent the seal attachment portion 46. As best shown in FIG. 2, the mid portion 47 of the seal carrier rail 40 is attached to the first portion 51 of the waist rail 50 in the assembled door 12. In this embodiment, the seal carrier rail 40 is attached to the waist rail 50 by an adhesive. However, any other suitable method of attachment may be used, some non-exhaustive examples of which are given below.

In this embodiment, the second portion 43 of the seal carrier rail 40 and the second portion 53 of the waist rail are connected to the outer door panel by anti-flutter material 70. However, in other embodiments only one, or neither, of the waist rail 50 and the seal carrier rail 40 are connected to the outer door panel by anti-flutter material 70.

Referring once again to FIG. 2, the inner-side portion 35 of the waist seal 30 comprises a sealing limb 61 which extends from a region proximate the inner-side edge 36 of the support portion 31 towards the distal end 37 of the inner-side portion 35. A sealing lip 62 extends from the distal end 37 of the inner-side portion 35 towards the outer-side portion 33. Similarly, a sealing lip 63 extends from the distal end 34 (see FIG. 5) of the outer-side portion 33 away from the inner-side portion 35.

The waist seal 30 also comprises a second sealing limb 64 located adjacent to the inner-side portion 35 of the waist seal 30 external to the channel 38 formed by the support portion 31, the outer-side portion 33 and the inner-side portion 35. In use, the second sealing limb 64 supports the glass pane 22 when the glass pane 22 is located entirely within the vehicle door 112 (see FIG. 6). The main function of the second sealing limb 64 is to support the glass pane 22 during door closing impact and to help prevent rattling.

As can be seen from FIG. 5, when the waist seal 30 is not installed on a vehicle door 12, the sealing limb 61 is biased away from the outer-side portion 33 of the waist seal 30 such that the channel 38 formed by the support portion 31, the inner-side portion 35 and the outer-side portion 33 is substantially U-shaped, and the sealing lips 62, 63 do not touch. In contrast to this, as shown in FIG. 2, when the waist seal 30 is installed on the vehicle door 12 and the glass pane 22 is at least partially received in the frame 24 (that is to say the window is closed or partially open), the sealing limb 61 is pushed towards the outer-portion 33 of the waist seal 30 by the glass pane 22 such that the sealing lips 62, 63 touch one another.

Figure 6:
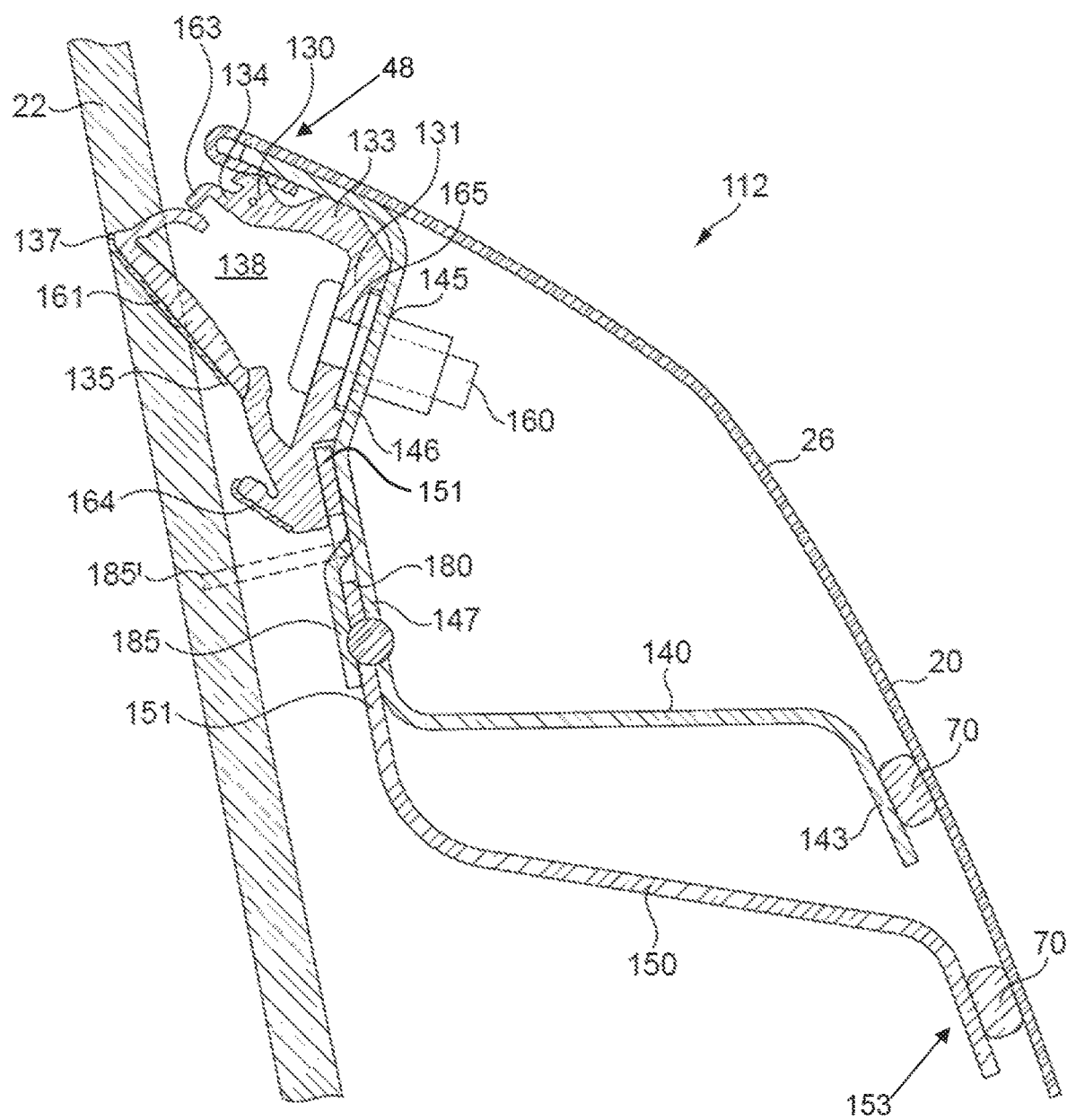
FIG. 6 shows a cross-sectional view taken through a portion of the outer-side of a door assembly comprising an alternative embodiment of a waist seal to that shown in FIG. according to examples disclosed herein.

FIG. 6 shows an alternative waist seal and door assembly for a vehicle door 112. The vehicle door 12 is the same in all respects to the vehicle door 12 described above except for in the details as described below.

In this embodiment the seal carrier rail 140 comprises a plurality of fixing elements 185 located on the mid-portion 147 of the seal carrier rail 140, and the waist rail 150 comprises a plurality of apertures 180 located in the first portion 151 of the waist rail 150. As shown in dashed outline, before the seal carrier rail 140 is attached to the waist rail 150, the fixing elements 185' project away from the mid-portion 146 of the seal carrier rail 140. To attach the seal carrier rail 140 to the waist rail 150, each fixing element 185' is passed through a respective aperture 180 in the waist rail 150. The fixing elements 185' are then folded into position 185 as shown in FIG. 6. The fixing elements 185 are formed integrally with the material of the seal carrier rail 140. As will be clear to a person skilled in the art, a similar fixing arrangement could find the fixing elements 185 located on the waist rail 150 and the apertures 180 located in the seal carrier rail 140, or a combination of the two. Although not shown in FIG. 6, an adhesive may optionally be used in addition to the fixing elements 185 in order to attach the seal carrier rail 140 to the waist rail 150.

Referring now to the waist seal 130 of FIG. 6, in this embodiment the support portion 131 of the waist seal 130 comprises a plurality of apertures 165. Each aperture 165 is configured to receive a mechanical fixing 160 which passes through the aperture 165 in the waist seal 130 and through a corresponding aperture 145 in the seal attachment portion 146 of the seal carrier rail 140. Any suitable mechanical fixing 160 may be used such as a self-fixing plug or rivet. Although not shown in FIG. 6, an adhesive may optionally be used in addition to the mechanical fixings 160 in order to attach the waist seal 130 to the seal carrier rail 140.

The waist seal 130 comprises a second sealing limb 164 located adjacent to the inner-side portion 135 of the waist seal 130 external to the channel 138 formed by the support portion 131, the outer-side portion 133 and the inner-side portion 135. In use, the second sealing limb 164 supports the glass pane 22 when the glass pane 22 is located entirely within the vehicle door 112. The second sealing limb 164 may also support the glass pane 22 when the window is closed or partially open.

The sealing lip 163 located at the distal end 134 of the outer-side portion 133 of the waist seal 130 shown in FIG. 6 projects towards the inner-side portion 135. Nonetheless, because the sealing limb 161 is biased away from the outer-side portion 133, when the waist seal 130 is not installed on a vehicle door 112, the distal ends 137, 134 of the inner-side portion 135 and the outer-side portion 133 do not touch.

In both of the examples discussed above, the waist seals 30, 130 comprise inner-side 35, 135 and outer-side 33, 133 portions that do not touch one another when the waist seal 30, 130 is not installed on a vehicle door 12, 112 such that the channel 38, 138 formed by the support portion 31, 131, the inner-side portion 35, 135, and the outer-side portion 33, 133 form a substantially U-shaped channel. In an alternative embodiment, the waist seal 30, 130 may be formed such that the inner-side portion 35, 135 and the outer-side portion 33, 133 do touch one another when the seal is not installed on a vehicle door 12, 112. In such an embodiment, the inner-sealing limb 61, 161 may still be biased away from the outer-side portion 33, 133 such that it bears against the glass pane 22 when the window is closed or partially open. Alternatively, the inner-sealing limb 61, 161 may not be biased in any direction.

Two methods of attaching the waist seal 30, 130 to the seal carrier rail 40, 140 are described above. As will be clear to a person skilled in the art, the waist seal 30, 130 may be attached to the seal carrier rail 40, 140 by any suitable method including adhesive only or any suitable mechanical fixing including, but not limited to integrally formed or separate: plugs, clips, bolts, tabs and rivets. In addition, the arrangement of mechanical fixings and apertures may be the inverse of that which is described above such that the mechanical fixings may be located on the seal carrier rail 40, 140 and the apertures located in the support portion 31, 131 of the waist seal 30, 130.

Similarly, two methods of attaching the seal carrier rail 40, 140 to the waist rail 50, 150 are described above. As will be clear to a person skilled in the art, the seal carrier rail 40, 140 may be attached to the waist rail 50, 150 by any suitable mechanical fixing including, but not limited to integrally formed or separate: plugs, clips, bolts, tabs and rivets. In addition, the arrangement of mechanical fixings and apertures may be the inverse of that which is described above such that the mechanical fixings may be located on the waist rail 50, 150 and the apertures located in the seal carrier rail 40, 140.

Figure 7:
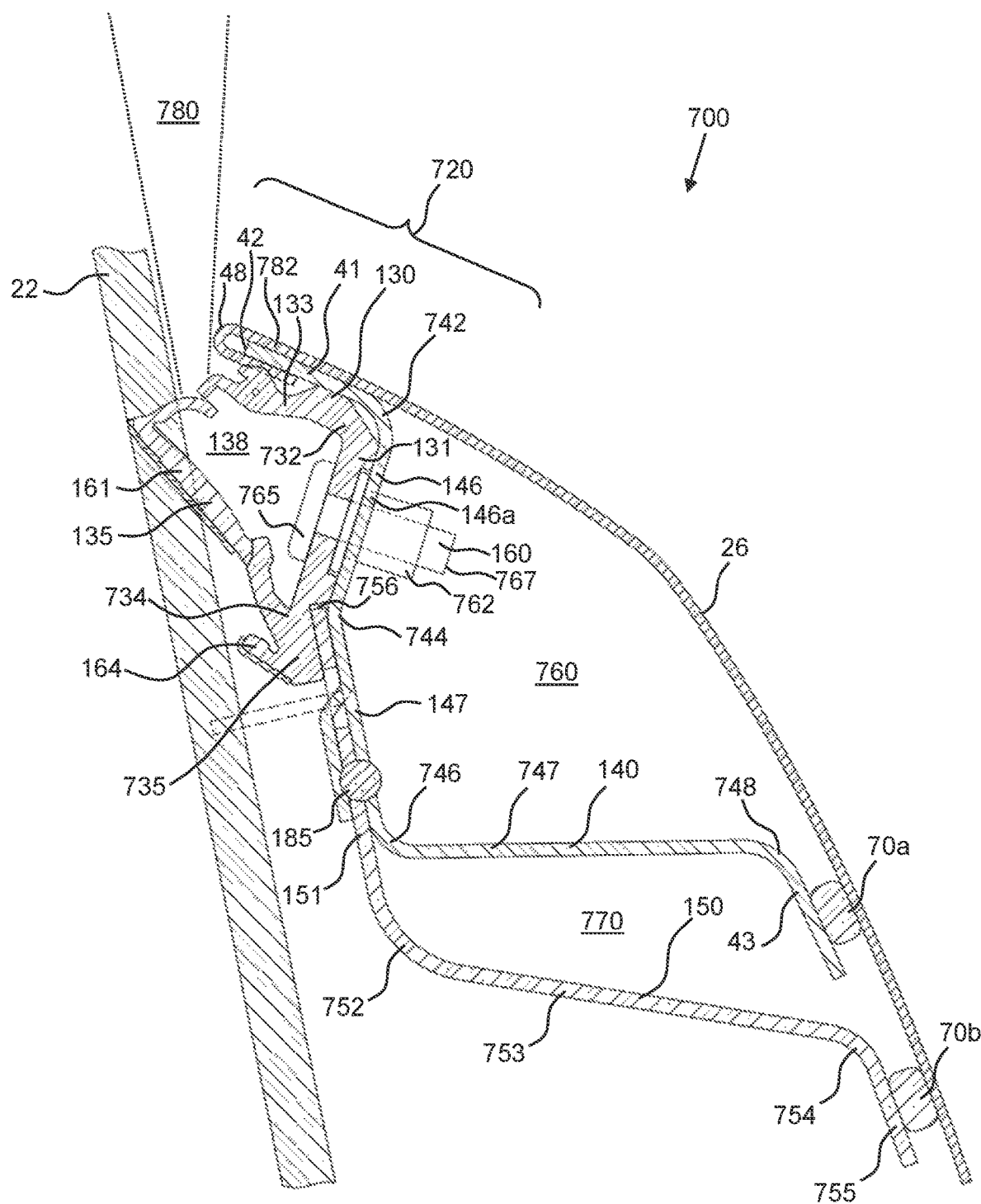
FIG. 7 shows the cross-sectional view of FIG. 6, with different labelling, according to examples disclosed herein.

FIG. 7 shows the waist seal 130 and a portion of a door assembly 700 for a vehicle door 112 of FIG. 6 with some different features labelled and discussed below. The vehicle door 112 is the same as the vehicle door 12 described above in relation to FIG. 2. FIG. 7 illustrates a vehicle door assembly 700 comprising an outer door panel skin 26 and a seal carrier rail 140. The seal carrier rail 140 is shaped to provide a first elongate recess 138 at a first face of the seal carrier rail 140 which is configured to accommodate a waist seal 130 within the first elongate recess 138. The seal carrier rail 140 is shaped to provide a second elongate recess 760 at a second face of the seal carrier rail 140 opposite the first face, wherein the second elongate recess 760 is located between the seal carrier rail 140 and the outer door panel skin 26.

The first elongate recess 138 provides an upper volume between the door glass 22, seal carrier rail 140 and outer door panel skin 26 in which to accommodate the waist seal 130 below the upper surface 720 of the outer door panel skin 26. This arrangement allows the waist seal 130 to be housed behind the upper portion 720 of the outer door panel skin 26, sheltering it from adverse weather exposure or exposure to dirt, grit or dust, which may cause damage to the waist seal 130. There is only a small field of ingress 780 by which the waist seal 130 can be accessed by e.g. dust. This also allows the waist seal 130 to be housed out of sight, which improves the aesthetic of the door and vehicle. In normal use, a person walking past or approaching the vehicle would not see the waist seal 130. Unless a person tries to look almost vertically downwards along the surface of the door glass 22, within a very narrow field of view 780 of a few degrees, then the waist seal is not visible. The upper surface 720 of the outer door panel skin 26 may be considered to comprise at least the portion of the outer door panel skin 26 within which the waist seal 130 is located.

The second elongate recess 760 below the first elongate recess 138 forms a lower volume 760 beneath the waist seal 130. The first 138 and second 760 elongate recesses facilitate the use of different types of fastener 160 (e.g. friction-based or threaded fasteners) as discussed below. For example, a nut or receiver 762 and bolt or fixing plug 160 fastener arrangement or similar may be used. The head 765 of the fixing plug 160 may be accommodated in the first elongate recess 138. A receiver 762 may fix the fixing plug 160 in place to secure the waist seal 130 to the seal carrier rail 140, and the receiver 762 may be accommodated in the second elongate recess 760. The shape of the second elongate recess 760 may also increase the outer door panel skin 26 stiffness without adding unnecessary weight. The seal carrier rail 140 may be affixed in the door assembly 700 at different points, and the zig-zag/bent cross sectional form of the seal carrier rail 140 may greatly add to door panel skin rigidity and door strength. So, the rigidity of the door is not as dependent on how and where the parts are fixed together, since the form of the seal carrier rail 140 makes a large contribution itself to door rigidity.

In such a vehicle door assembly 700, a first portion 41 of the seal carrier rail 140 proximal to an upper seal carrier rail edge 42 may be secured to an uppermost portion 720 of the outer door panel skin 26. The uppermost portion 720 of the outer door panel skin 26 comprises an uppermost outer door panel skin edge 48 which in this example is shown as a folded portion of a hemmed edge of the outer door panel skin 26. The first elongate recess 138 is arranged to accommodate a waist seal 130 below said uppermost outer door panel skin edge 720. The first portion 41 of the seal carrier rail 140 proximal to the upper seal carrier rail edge 42 in this example is canted at a first bend 742 in the seal carrier rail 140.

A channel of the waist seal (within the first elongate recess 138) may be formed by an inner side portion 135, a support portion 131, and an outer side portion 133, and the waist seal 130 may sit inside the upper door panel portion 720 of the outer door panel skin 26 with the support portion 131 secured to the seal attachment portion 146 of the seal carrier rail 140. The upper door panel portion 720 thereby hides the waist seal 130 from normal view, or in other words, the seal attachment portion 146 and waist seal 130 are not visible in normal use (i.e. when a person is walking past, or approaching the vehicle to enter.)

The first portion 41 of the seal carrier rail 140 and an upper seal carrier rail edge 42 proximal to the first portion 41 may be located inside, and secured to the outer door panel skin 26 by, a hemmed connection 48 of the outer door panel skin 26. The hemmed connection 48 therefore provides an aesthetically pleasing, readily manufactured, strong connection point to fix the seal carrier rail 140 in place in the upper portion of the door panel 720. In the examples shown, the first portion 41 of the seal carrier rail 140 and the hemmed connection 48 are angled towards the glass 22 rather than being formed as an upstand from the outer surface of the door skin 26 and are thus not substantially parallel with the door glass 22 as would traditionally be used. By virtue of the waist seal 30 being secured to and supported by the seal carrier rail 40, itself effectively depending from the hemmed connection 48 with the outer door skin 26, the waist seal 30 is arranged below the hemmed connection 48 and is thus does not act as a visible boundary between the door glass 22 and the door skin 26.

The seal carrier rail 140 may be shaped to form the second elongate recess 760 by comprising a first bend 742 between a) the first portion 41 of the seal carrier rail 140 proximal to an upper seal carrier rail edge 42 and b) a seal attachment portion 146 of the seal carrier rail 140. This first bend 742 may serve to orient the seal attachment portion 146 away from the outer door panel skin 26. The first portion 41 is aligned coplanar with an uppermost portion 720 of the outer door panel skin 26. The seal carrier rail 140 may be shaped to form the second elongate recess 760 by comprising a second bend 746 between the seal attachment portion 146 of the seal carrier rail and a lower portion 747 of the seal carrier rail 140 to orient the lower portion 747 towards the outer door panel skin 26. The seal carrier rail 140 may be shaped to form the second elongate recess 760 in some examples by further comprising a further bend 744 in the seal attachment portion 146 between an upper seal attachment portion 146a of the seal attachment portion 146 and a lower fixing portion 147 of the seal attachment portion 146. The upper seal attachment portion 146a is configured to have a waist seal 130 affixed thereto. The seal carrier rail 140 may be shaped to form the second elongate recess 760 by comprising a third bend 748 between the lower portion 747 and a second portion 43 of the seal carrier rail 140 to orient the second portion 43 coplanar with the outer door panel skin 26, for example so it can be fixed thereto by a fixing 70a. The lower portion 747 of the seal carrier rail 140 may be substantially horizontal when installed in a vehicle in a usual orientation i.e. all vehicle wheels contacting horizontal ground. This horizontal arrangement of the lower portion 747 of the seal carrier rail 140 may improve structural stability of the door panel.

The second elongate channel 760 may thereby form a box-shaped, or polygonal, cross sectional recess, to improve stiffness of the assembly 700. By improving stiffness characteristics of the door panel, noise, vibration and harshness (NVH) characteristics of the door and vehicle in turn are improved.

The vehicle door assembly 700 in FIG. 7 further comprises a waist seal 130 located within the first elongate recess 138. A bend 732 along the length of the waist seal 130 located between an outer side portion 133 of the waist seal 130 and a support portion 131 of the waist seal 130 is located within the first bend 742 of the seal carrier rail 140. This nesting of the waist seal 130 bend 732 inside the bend 742 of the seal carrier rail 140 may provide good structural support to the waist seal 130, such as when operating the door glass 22 to move up and down against the sealing limb 161.

The outer side portion 133 of the waist seal 130 may abut the first portion 41 of the seal carrier rail 140. The first portion 41 of the seal carrier rail 140 may abut the uppermost portion 720 of the outer door panel skin 26. Such abutments may contribute to improving the security of the fixing of the waist seal 130 to the seal carrier rail 140 and the fixing of the seal carrier rail 140 to the outer door panel skin 26.

The vehicle door assembly 700 may further comprise a fixture 160 configured to attach the support portion 131 of the waist seal 130 to a seal attachment portion 146 of the seal carrier rail 140. The fixture 160 may comprise a head 765 located in the first elongate recess 138; and a tip 767 opposite the head 765, the tip 767 located in the second elongate recess 760. The vehicle door assembly 700 may further comprise a fastener 762 located in the second elongate recess 760. The fastener 762 may be configured to fit around the tip 767 of the fixture 160 and, with the fixture 160, secure the waist seal 130 to the seal attachment portion 146 of the seal carrier rail 140.

Such a fixture 160 may be formed to provide structural support, and the presence of the first 138 and second 760 elongated portions of the seal carrier rail 140 provide for design and manufacturing freedom in choosing a suitably shaped and operatable fixture 160 by providing space for portions of the fixture 160 to be located in the door assembly 700. The fixture 160 may, for example, have a fixture head 765, such as a bolt- or fixing plug head, with an shape extending outwards against the waist seal 130 (in this example, towards the inner-side portion 135 and outer-side portion 133) to support the fixture 160 (i.e. the head 765) against the waist seal 130. Such a fixture head 765 can provide good load spread from the fixing 160 and help to support the outer side portion 133 of the waist seal 130 against the first portion 41 of the seal carrier rail 140. This fixture head 765 form may also help to spread any bending loading caused by friction between the door glass 22 and the waist seal 130 which may otherwise typically act to drive seal deflection (lozenging). A broad/extended head 765 of the fastener 160 helps stiffen the base (support portion) of the waist seal 131 between the inner 135 and outer 133 portions (limbs) of the waist seal 130, further improving performance in use.

In other examples, a fixture 160 may comprises a head 765 shaped to extend towards one or more of: a bend 732 along the length of the waist seal 130 between the outer side portion 133 of the waist seal 130 and the support portion 131 of the waist seal 130; and a bend 734 along the length of the waist seal 130 between the inner side portion 135 of the waist seal 130 and the support portion 131 of the waist seal 130.

The vehicle door assembly 700 in this example further comprises the waist rail 150. The waist rail 150 in this example comprises a first bend 752 between a first waist rail portion 151 and a second waist rail portion 753. The first bend 752 is configured to orient the first waist rail portion 151 coplanar with a seal attachment portion 147 of the seal carrier rail 140 and direct the second waist rail portion 753 towards the outer door panel skin 26. The waist rail 150 in this example comprises a second bend 754 between the second waist rail portion 753 and a third waist rail portion 755. The second bend 754 is configured to orient the third waist rail portion 755 to be coplanar with and adjacent to the outer door panel skin 26. The first bend 752 may be parallel with, and in the opposite direction to, the second bend 754, in some examples. The second bend 754 may be located adjacent to the outer door panel skin 26 for affixing thereto, for example by a fixing 70b such as an anti-flutter fixing. There may be a further volume 770 formed between the lower portion 747 of the seal carrier rail 140 and the second waist rail portion 753 of the waist rail 150, with the outer door panel skin 26. The shape of the waist rail 150, similarly to the shape of the seal carrier rail 140, may, by way of the bends 752, 754, and the formation of a further volume 770, act to improve door panel assembly 700 stability and thus in turn reduce NVH noise.

The waist rail 150 may be attached to one or more of: the seal attachment portion 147 of the of the seal carrier rail 140; and the outer door panel skin 26. The waist rail 150 may be attached to the seal attachment portion 146 by a fixture 185 fixing the waist rail 150 to the seal attachment portion 146, 147 of the seal carrier rail 140. The waist rail 150 may be attached to the seal attachment portion 146 by the waist seal 130 and the seal attachment portion 146, 147 of the seal carrier rail 140 sandwiching an edge 756 of the waist rail 150 therebetween (the portion 735 of the waist seal 130 sandwiching the waist rail 150 edge 756 is proximal to the second sealing limb 164 of the waist seal 130).

The seal carrier rail 140 may be attached to a first fixing point 782 attaching a first portion proximal 41 to a first edge 42 of the seal carrier rail 140 to the outer door panel skin 26, by a hemmed connection 48 of the outer door panel skin 26. The seal carrier rail 140 may be attached to a second fixing point 185 of a seal attachment portion 147 of the seal carrier rail 140 to the waist rail 150. The seal carrier rail 140 may be attached to a third fixing point 70a of the second portion 43 proximal to a second edge of the seal carrier rail 140, opposite the first edge 42 of the seal carrier rail 140, to the outer door panel skin 26. The fixing 70a may comprise anti flutter material.

A vehicle door 12 may comprise the vehicle door assembly 700 discussed above. A vehicle 10 may comprise the vehicle door assembly 700 discussed above.

Figure 8:
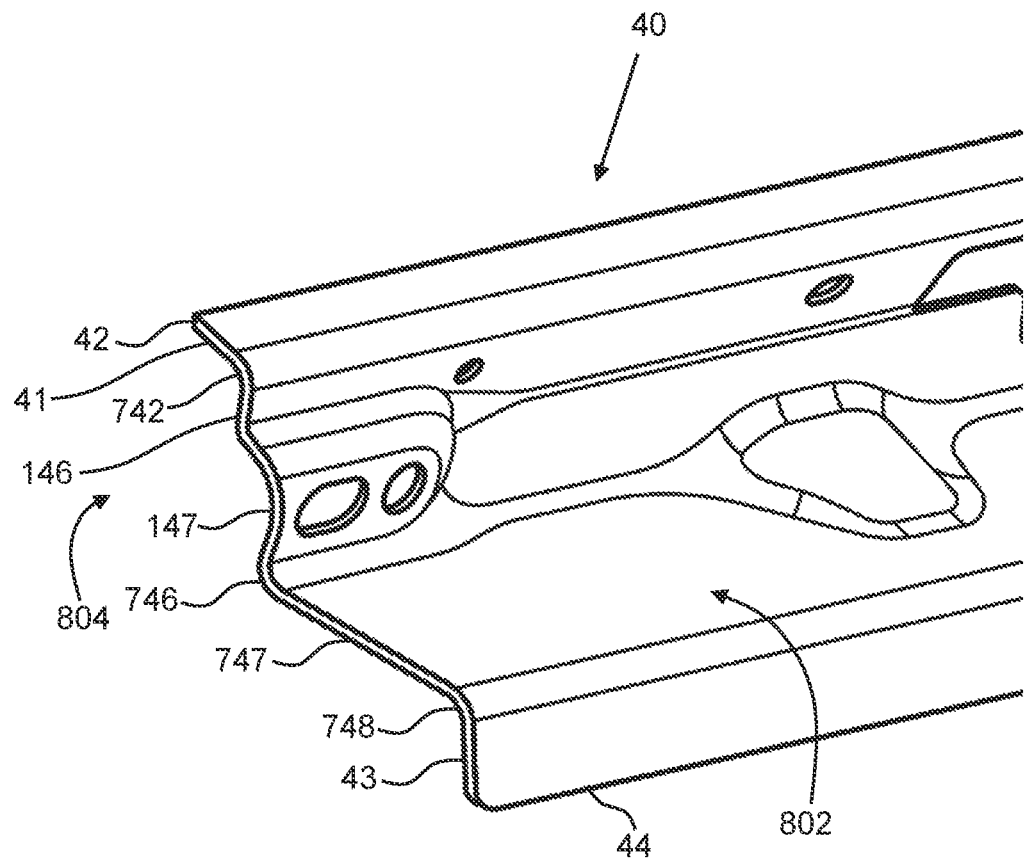
FIG. 8 shows an end portion of a seal carrier rail as in FIG. 3, according to examples disclosed herein.

FIG. 8 shows an end of a seal carrier rail 40 as shown in FIG. 3. The seal carrier rail 40 end is labelled to illustrate the bends and rail portions discussed in relation to FIG. 7. The first portion 41 of the seal carrier rail 40 has a first edge 42, and a second portion 43 of the seal carrier rail 40 located adjacent a second edge 44. The outer door panel skin 26 (not shown) may be attached to the first portion 41 of seal carrier rail 40 by a hemmed connection 48 such that the outer door panel skin 26 is folded over the first edge 42 of the seal carrier rail 40. Together, the seal carrier rail 40 and the outer door panel skin 26 form the outer door panel 20.

The seal carrier rail 40 is shaped as discussed in relation to FIG. 7 such that the first portion 41 is connected via a bend 742 to the seal attachment portion 146. The seal attachment portion 146 is connected at the opposite edge to a mid-portion 147 of the seal carrier rail 140. The mid portion 147 is connected at the opposite edge by a bend 746 to a lower portion 747 of the seal carrier rail 140. The lower portion 747 is connected at the opposite edge to the first edge 42 by the bend 748. The bends 742 and 748 serve to locate the central portions (seal attachment portion 146, mid portion 147, and lower portion 747 of the seal carrier rail 40 away from the outer door panel 20 when the seal carrier rail 140 is installed in a vehicle door and form a cavity by the outer door panel skin 26 and a first face 802 of the seal attachment portion 146, 147 of the seal carrier rail portions and the lower portion 747 of the seal carrier rail 140. A cavity is also formed at the opposite face 804 of the seal carrier rail 40 by the first portion 41 and the seal attachment portion 146 in which a waist seal 130 may be located so that, when the door assembly comprising the waist seal 130, seal carrier rail 140, waist rail 150 and door panel 20 are part of a complete door of a vehicle 10, the waist seal 130 is not visible to someone observing the vehicle 10 (e.g. by walking past it to approaching it to enter by the door). This example seal carrier rail 40 does not include the bend 744 shown in FIG. 7 between the seal attachment portion 146 and the mid portion 147.

Figure 9:
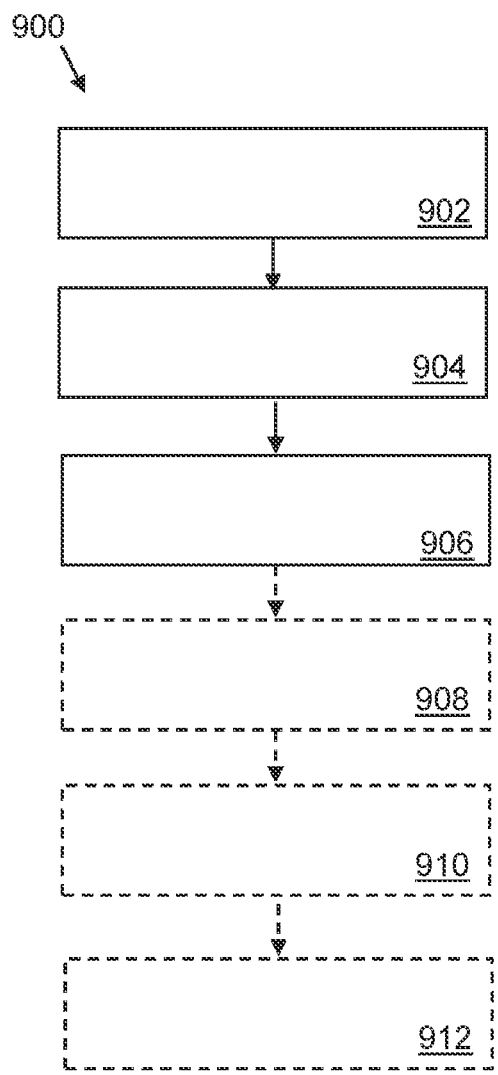
FIG. 9 shows a method 900 of manufacturing a vehicle door assembly 700 according to examples disclosed.

FIG. 9 illustrates a method 900 of manufacturing a vehicle door assembly 700. The method comprising: forming a seal carrier rail 902 to comprise: a first elongate recess at a first face of the seal carrier rail; and a second elongate recess at a second face of the seal carrier rail opposite the first face; fixing an outer door panel skin to a first portion of the seal carrier rail 904 by hemming an upper portion of the outer door panel skin over a first edge of the first portion of the seal carrier rail to form a hemmed connection; and fixing the outer door panel skin to a second portion of the seal carrier rail 906, the second portion at an opposite side of the seal carrier rail to the first portion, such that the second elongate recess is located between the seal carrier rail and the outer door panel skin. The method 900 of manufacturing the vehicle door assembly 700 may further comprise accommodating a waist seal below an uppermost outer door panel skin edge of the hemmed connection 908; and fixing the accommodated waist seal within the first elongate recess 910. The method 900 of manufacturing a vehicle door assembly 700 may further comprise fixing a waist rail to the seal carrier rail 912.

In this way, the structurally supportive elements of the vehicle door assembly (i.e. the outer door panel skin 26 and the seal carrier rail 140) are first assembled 902, 904, 906 including providing a hemmed connection (that is, there is sufficient working space to allow for the manufacture of the door panel assembly by providing the hemmed connection), and this sub-assembly may then be fitted with the waist seal 908, 910. Thus manufacture is possible to both include the desirable hemmed connection at the top of the door panel assembly, and the waist seal can be accommodated underneath the hemmed connection within the upper portion of the door panel The following numbered clauses also form a part of this description:

Clause 1. An assembly for a vehicle framed door, the assembly comprising:
 a. an outer door panel skin;
 b. a waist rail; and
 c. a seal carrier rail,
 d. wherein the seal carrier rail is attached to the waist rail, and wherein the outer door panel skin is attached to a portion of the seal carrier rail.

Clause 2. An assembly as per clause 1, wherein:
 a. the waist rail comprises a first portion located adjacent a first edge of the waist rail, and a second portion located adjacent a second edge of the waist rail; and
 b. the seal carrier rail comprises a first portion located adjacent a first edge of the seal carrier rail, and a second portion located adjacent a second edge of the seal carrier rail,
 c. wherein the outer door panel skin is attached to the first portion of the seal carrier rail, and wherein the seal carrier rail is attached to the waist rail such that the first portion (41) of the seal carrier rail extends beyond the first edge of the waist rail, and the second portion of the waist rail extends beyond the second edge of the seal carrier rail.

Clause 3. An assembly as per clause 2, wherein the seal carrier rail comprises a seal attachment portion located adjacent the first portion of the seal carrier rail.

Clause 4. An assembly as per clause 3, wherein the seal attachment portion comprises a plurality of apertures for receiving mechanical fixings.

Clause 5. An assembly as per clause 3 or clause 4, wherein the seal carrier rail comprises a mid-portion located adjacent the seal attachment portion, wherein the mid-portion of the seal carrier rail is attached to the first portion of the waist rail.

Clause 6. An assembly as per clause 5, wherein the seal carrier rail comprises a plurality of fixing elements located on the mid-portion of the seal carrier rail, and wherein the waist rail comprises a plurality of apertures located in the first portion of the waist rail, wherein at least some of the fixing elements of the seal carrier rail pass through at least some of the apertures in the waist rail.

Clause 7. An assembly as per any of clause 1 to 6, wherein the outer door panel skin is attached to the first portion of the seal carrier rail by a hemmed connection.

Clause 8. An assembly as per any of clause 1 to 7, wherein the second portion of the seal carrier rail is connected to the outer door panel skin.

Clause 9. An assembly as per any of clause 1 to 8, wherein the second portion of the waist rail is connected to the outer door panel skin.

Clause 10. A vehicle framed door seal assembly comprising:
 a. a vehicle framed door assembly in accordance with any one of clauses 1 to 9; and
 b. a waist seal comprising:
  i. an elongate support portion;
  ii. an elongate inner-side portion; and
  iii. an elongate outer-side portion,
 c. wherein the elongate inner-side portion and the elongate outer-side portion each comprise a proximal end connected to the elongate support portion and a distal end remote from the elongate support portion, wherein the elongate inner-side portion and the elongate outer-side portion each extend away from opposing sides of the elongate support portion such that together the elongate inner-side portion, the elongate outer-side portion and the elongate support portion form a channel, wherein the elongate support portion is attached to the seal support rail of the vehicle door assembly.

Clause 11. A vehicle framed door seal assembly as per clause 10, wherein the elongate support portion of the waist seal comprises a plurality of apertures, wherein the waist seal is attached to the seal carrier rail by a plurality of mechanical fixings which pass through the apertures in the elongate support portion.

Clause 12. A vehicle framed door seal assembly as per clause 10, wherein the elongate support portion of the waist seal comprises a plurality of mechanical fixings, wherein the waist seal is attached to the seal carrier rail by the plurality of mechanical fixings.

Clause 13. A vehicle framed door seal assembly as per clause 12, wherein the plurality of mechanical fixings are integrally formed with the waist seal.

Clause 14. A vehicle door comprising a vehicle framed door seal assembly in accordance with any of clauses 10 to 13.

Clause 15. A vehicle door as per clause 14, wherein the waist seal is located within the door in normal use.

Clause 16. A vehicle comprising a vehicle door per clause 14 or clause 15

Clause 17. A method of assembling a vehicle framed door, the method comprising:
  a. attaching an outer door panel skin to a seal carrier rail; and
  b. attaching the seal carrier rail to a waist rail,
  c. wherein the outer door panel skin is attached to the seal carrier rail before the seal carrier rail is attached to the waist rail.

Clause 18. A method per clause 17, wherein the outer door panel skin is attached to the seal carrier rail by a hemmed connection.

Clause 19. A method per clause 17 or clause 18, comprising attaching a waist seal to the seal carrier rail.

Clause 20. A method per clause 19, wherein the waist seal comprises:
  a. an elongate support portion;
  b. an elongate inner-side portion; and
  c. an elongate outer-side portion,
  d. wherein the elongate inner-side portion and the elongate outer-side portion each comprise a proximal end connected to the elongate support portion and a distal end remote from the elongate support portion, wherein the elongate inner-side portion and the elongate outer-side portion each extend away from opposing sides of the elongate support portion such that together the elongate inner-side portion, the elongate outer-side portion and the elongate support portion form a channel, wherein the elongate support portion is configured for attachment to the seal carrier rail.

Clause 21. A method per clause 20, wherein the waist seal is attached to the seal carrier rail by a plurality of mechanical fixtures each of which passes through a respective aperture in the support portion of the waist seal.

Clause 22. A method per clause 20, wherein the waist seal is attached to the seal carrier rail by a plurality of mechanical fixtures each of which passes through a respective aperture in the seal carrier rail.

Clause 23. A method per clause 22, wherein the mechanical fixtures are integrally formed with the waist seal.

Clause 24. A waist seal for a vehicle door, the vehicle door comprising a support frame and an outer door panel attached to the support frame, the waist seal comprising:
  a. an elongate support portion;
  b. an elongate inner-side portion; and
  c. an elongate outer-side portion,
    wherein the elongate inner-side portion and the elongate outer-side portion each comprise a proximal end connected to the elongate support portion and a distal end remote from the elongate support portion, wherein the elongate inner-side portion and the elongate outer-side portion each extend away from opposing sides of the elongate support portion such that together the elongate inner-side portion, the elongate outer-side portion and the elongate support portion form a channel, wherein the elongate support portion is configured for attachment to the outer door panel of the vehicle door.

Clause 25. A waist seal as per clause 24, wherein the elongate support portion comprises one or more fixing features for facilitating attachment of the waist seal to the outer door panel.

Clause 26. A waist seal per clause 25, wherein the one or more fixing features comprise a plurality of apertures, wherein each aperture is configured to receive a fixing for attaching the waist seal to the outer door panel.

Clause 27. A waist seal per clause 25, wherein the one or more fixing features comprise one or more mechanical fixings which are configured to be received within respective apertures in the outer door panel.

Clause 28. A waist seal per clause 27, wherein the mechanical fixings are integrally formed with the waist seal.

Clause 29. A waist seal as per any of clauses 24 to 28, wherein the elongate inner-side portion and the elongate outer-side portion contact one another in the vicinity of their distal ends.

Clause 30. A waist seal as per any of clauses 24 to 29, wherein the channel is substantially U-shaped in cross-section.

Clause 31. A waist seal as per any of clauses 24 to 30, wherein the channel is configured to adopt a substantially closed cross-section in-use.

Clause 32. A waist seal as per any of clauses 24 to 31, wherein the elongate inner-side portion comprises a sealing lip which extends towards the elongate outer-side portion.

Clause 33. A waist seal as per any of clauses 24 to 32, wherein the elongate outer-side portion comprises a sealing lip which extends towards the elongate inner-side portion, or away from the elongate inner-side portion.

Clause 34. A waist seal per any of clauses 24 to 33, wherein a section of the elongate inner-side portion comprises a sealing limb, wherein the sealing limb is biased away from the elongate outer-side portion.

Clause 35. A waist seal per any of clauses 24 to 34, comprising a second sealing limb located adjacent to the elongate inner-side portion external to the channel.

Clause 36. A waist seal per any of clauses 24 to 25, wherein the elongate support portion, the elongate inner-side portion, the elongate outer-side portion, the sealing lip or lips when present, and the second sealing limb when present, comprise a single extrusion.

Clause 37. A method of attaching a waist seal to a vehicle door assembly, the method comprising:
  a. providing a waist seal in accordance with any of clauses 24 to 36; and
  b. attaching the elongate support portion of the waist seal to a waist seal support structure of the vehicle door assembly.

Clause 38. A method per clause 37, wherein the waist seal comprises a plurality of apertures which are each configured to receive a fixing for attaching the waist seal to the waist seal support structure, the method comprising:
  a. placing a mechanical fixing into at least two of the plurality of apertures; and
  b. securing each mechanical fixing to the waist seal support structure.

Clause 39. A method per clause 37, wherein the waist seal comprises a plurality of mechanical fixings which are each configured to be received within an aperture of
  a. placing at least some of the mechanical fixings into respective apertures in the waist seal support structure; and
  b. securing each mechanical fixing to the waist seal support structure.

Clause 40. A method per clause 38 or clause 39, wherein the mechanical fixings comprise a clip or plug type fixing.

Clause 41. A method of manufacturing a waist seal for a vehicle door, the method comprising:
  a. extruding a waist seal comprising a elongate support portion, an elongate inner-side portion, and an elongate outer-side portion in a single extrusion process, wherein the elongate inner-side portion and the elongate outer-side portion each comprise a proximal end connected to the elongate support portion and a distal end remote from the elongate support portion, wherein the elongate inner-side portion and the elongate outer-side portion each extend away from opposing sides of the elongate support portion such that together the elongate inner-side portion, the elongate outer-side portion and the elongate support portion form a channel; and b. forming one or more fixing features for facilitating attachment of the waist seal to an outer door panel of a vehicle door on or in the elongate support portion.

Clause 42. A method per clause 41, wherein forming one or more fixing features comprises forming a plurality of apertures in the support portion.

Clause 43. A method per clause 41, wherein forming one or more fixing features comprises forming a plurality of mechanical fixings on the support portion.

Clause 44. A vehicle door comprising a waist seal as per any of clauses 24 to 36.

Clause 45. A vehicle comprising a vehicle door as per clause 44.

FIGS. 1-9 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The invention claimed is:

1. A vehicle door assembly, comprising:
an outer door panel skin;
a seal carrier rail, wherein the seal carrier rail is shaped to provide:
a first elongate recess at a first face of the seal carrier rail, the first elongate recess providing an upper volume between a glass pane of a vehicle door, the seal carrier rail and the outer door panel skin; and
a second elongate recess at a second face of the seal carrier rail opposite the first face, wherein the second elongate recess is located between the seal carrier rail and the outer door panel skin; and
a waist seal comprising an elongate support portion, an elongate inner-side portion bounding the elongate support portion on an inner-side away from the outer door panel skin, and an elongate outer-side portion bounding the elongate support portion on an outer-side towards the outer door panel skin, wherein:
the elongate inner-side portion and the elongate outer-side portion each comprises a proximal end connected to the elongate support portion and a distal end remote from the elongate support portion, wherein the elongate inner-side portion and the elongate outer-side portion extend away from respective opposing sides of the elongate support portion, such that the elongate inner-side portion, the elongate outer-side portion, and the elongate support portion together form a channel;
the elongate outer-side portion comprises a sealing lip located at the distal end of the elongate outer-side portion, the distal end of the elongate outer-side portion projecting towards the elongate inner-side portion;
the elongate support portion comprises one or more fixing features disposed between the proximal ends of the elongate inner-side portion and the elongate outer-side portion, wherein the elongate support portion is attached to the seal carrier rail by way of the one or more fixing features such that the waist seal is located entirely within the upper volume of the first elongate recess and the waist seal is hidden from view at least when the glass pane of the vehicle door assembly is in a closed configuration; and
the waist seal is configured such that the channel defines a substantially closed cross-section at least when the glass pane is closed.

2. The vehicle door assembly of claim 1, wherein:
a first portion of the seal carrier rail proximal to an upper seal carrier rail edge is secured to an uppermost portion of the outer door panel skin, the uppermost portion of the outer door panel skin comprising an uppermost outer door panel skin edge; and
the first elongate recess is arranged to accommodate the waist seal below said uppermost outer door panel skin edge.

3. The vehicle door assembly of claim 1, wherein:
a first portion of the seal carrier rail is canted at a first bend in the seal carrier rail.

4. The vehicle door assembly of claim 3, wherein:
the first portion of the seal carrier rail and an upper seal carrier rail edge proximal to the first portion are located inside, and secured to the outer door panel skin by, a hemmed connection of the outer door panel skin.

5. The vehicle door assembly of claim 1, wherein the seal carrier rail is shaped to form the second elongate recess by comprising:
a first bend between a first portion of the seal carrier rail proximal to an upper seal carrier rail edge and a seal attachment portion of the seal carrier rail to orient the seal attachment portion away from the outer door panel skin, wherein the first portion is aligned coplanar with an uppermost portion of the outer door panel skin;
a second bend between the seal attachment portion of the seal carrier rail and a lower portion of the seal carrier rail to orient the lower portion towards the outer door panel skin; and a third bend between the lower portion and a second portion of the seal carrier rail to orient the second portion coplanar with the outer door panel skin.

6. The vehicle door assembly of claim 5, wherein the seal carrier rail is shaped to form the second elongate recess by further comprising a further bend in the seal attachment portion between an upper seal attachment portion of the seal attachment portion and a lower fixing portion of the seal attachment portion, the upper seal attachment portion configured to have the waist seal affixed thereto.

7. The vehicle door assembly of claim 5, wherein a bend along a length of the waist seal between an outer side portion of the waist seal and the support portion of the waist seal is located within the first bend of the seal carrier rail.

8. The vehicle door assembly of claim 7, wherein the outer side portion of the waist seal abuts the first portion of the seal carrier rail, and the first portion of the seal carrier rail abuts an uppermost portion of the outer door panel skin.

9. The vehicle door assembly of claim 7, further comprising a fixture that attaches the support portion of the waist seal to a seal attachment portion of the seal carrier rail.

10. The vehicle door assembly of claim 1, further comprising a waist rail, the waist rail comprising one or more of:
a first bend between a first waist rail portion and a second waist rail portion, the first bend configured to orient the first waist rail portion coplanar with a seal attachment portion of the seal carrier rail and direct the second waist rail portion towards the outer door panel skin; and
a second bend between the second waist rail portion and a third waist rail portion, the second bend configured to orient the third waist rail portion to be coplanar with and adjacent to the outer door panel skin.

11. The vehicle door assembly of claim 10, wherein the waist rail is attached to one or more of:
the seal attachment portion of the of the seal carrier rail; and
the outer door panel skin.

12. The vehicle door assembly of claim 11, wherein the waist rail is attached to the seal attachment portion by one or more of:
a fixture fixing the waist rail to the seal attachment portion of the seal carrier rail; and
a waist seal and the seal attachment portion of the seal carrier rail sandwiching an edge of the waist rail therebetween.

13. The vehicle door assembly of claim 1, wherein the seal carrier rail is attached to one or more of:
a first fixing point attaching a first portion proximal to a first edge of the seal carrier rail to the outer door panel skin, by a hemmed connection of the outer door panel skin;
a second fixing point of a seal attachment portion of the seal carrier rail to a waist rail; and
a third fixing point of a second portion proximal to a second edge of the seal attachment portion, opposite the first edge of the seal carrier rail, to the outer door panel skin.

14. A method of manufacturing a vehicle door assembly, comprising:
forming a seal carrier rail to comprise:
a first elongate recess at a first face of the seal carrier rail; and
a second elongate recess at a second face of the seal carrier rail opposite the first face;
fixing an outer door panel skin to a first portion of the seal carrier rail by hemming an upper portion of the outer door panel skin over a first edge of the first portion of the seal carrier rail to form a hemmed connection, the first elongate recess providing an upper volume between a glass pane of a vehicle door, the seal carrier rail and the outer door panel skin;
fixing the outer door panel skin to a second portion of the seal carrier rail, the second portion at an opposite side of the seal carrier rail to the first portion, such that the second elongate recess is located between the seal carrier rail and the outer door panel skin;
accommodating a waist seal below an uppermost outer door panel skin edge of the hemmed connection, the waist seal comprising:
an elongate support portion;
an elongate inner-side portion bounding the elongate support portion on an inner-side away from the outer door panel skin; and
an elongate outer-side portion bounding the elongate support portion on an outer-side towards the outer door panel skin, wherein:
the elongate inner-side portion and the elongate outer-side portion each comprises a proximal end connected to the elongate support portion and a distal end remote from the elongate support portion, wherein the elongate inner-side portion and the elongate outer-side portion extend away from respective opposing sides of the elongate support portion such that together the elongate inner-side portion, the elongate outer-side portion, and the elongate support portion form a channel;
the elongate outer-side portion comprises a sealing lip located at the distal end of the elongate outer-side portion, the distal end of the elongate outer-side portion projecting towards the elongate inner-side portion; and
the elongate support portion comprises one or more fixing features disposed between the proximal ends of the elongate inner-side portion and the elongate outer-side portion; and
fixing the elongate support portion to the seal carrier rail by way of the one or more fixing features such that the waist seal is:
located entirely within the upper volume of the first elongate recess;
hidden from view at least when the glass pane of the vehicle door is closed; and
wherein the waist seal is configured such that the channel defines a substantially closed cross-section at least when the glass pane is closed.

15. The method of manufacturing the vehicle door assembly of claim 14, further comprising fixing a waist rail to the seal carrier rail.

16. A vehicle comprising the vehicle door assembly of claim 1.

17. The vehicle door assembly of claim 1, wherein the distal end of the elongate outer-side portion projects towards the elongate inner-side portion such that the distal end contacts the elongate inner-side portion and is separated from the glass pane.

18. The method of manufacturing the vehicle door assembly of claim 14, wherein the distal end of the elongate outer-side portion projects towards the elongate inner-side portion such that the distal end contacts the elongate inner-side portion and is separated from the glass pane.

* * * * *